INVENTORS
Christian H. Miller
John C. Bletzinger
By: Olson, Trexler, Wolters & Bushnell attys

United States Patent Office 3,278,152
Patented Oct. 11, 1966

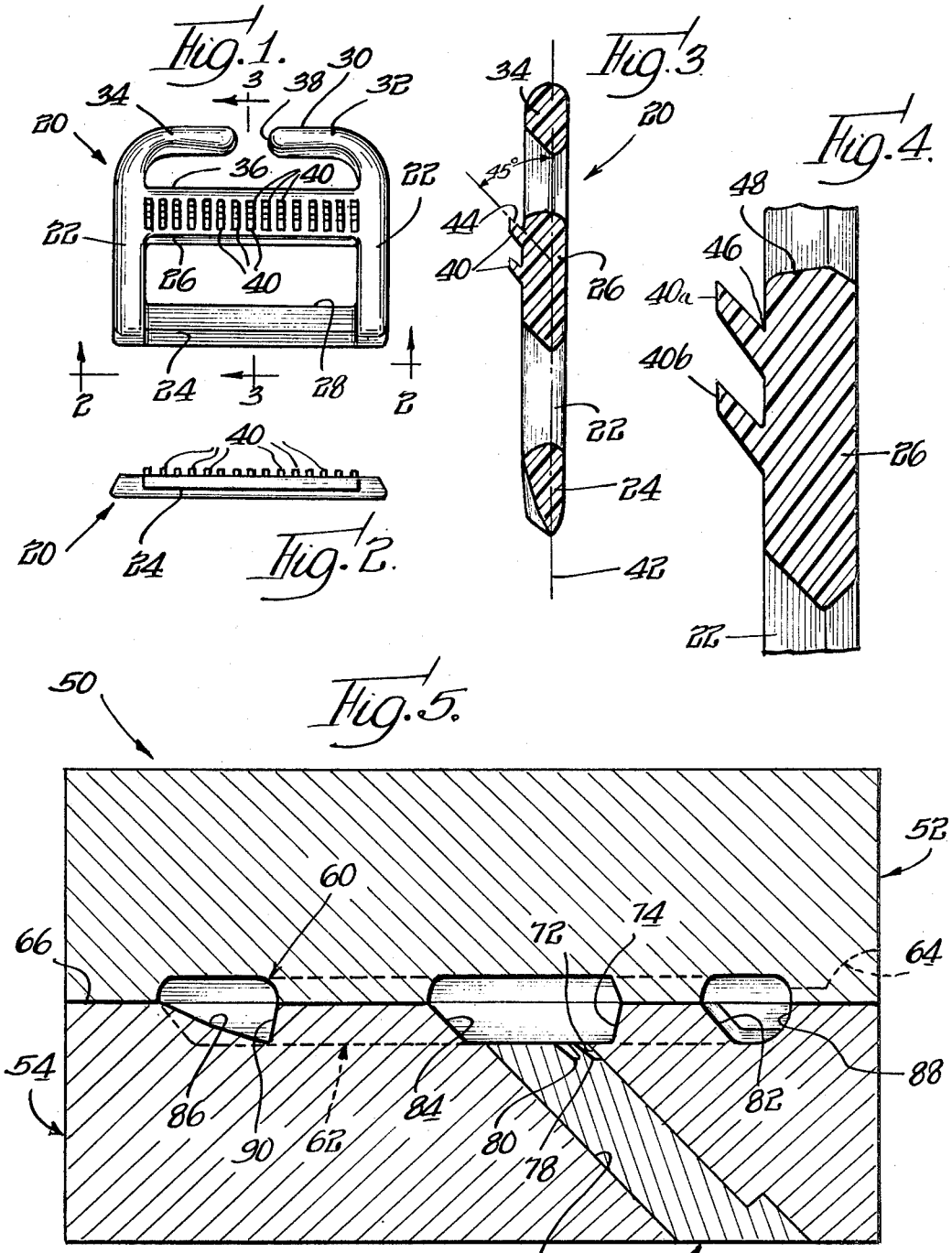
Oct. 11, 1966  C. F. MILLER ET AL  3,278,152
MOLD FOR PLASTIC ARTICLE
Filed Dec. 30, 1963  2 Sheets-Sheet 1
INVENTORS
Christian F. Miller
John C. Bletzinger
By: Olson, Trexler, Wolters & Bushnell
attys Oct. 11, 1966  C. F. MILLER ET AL  3,278,152
MOLD FOR PLASTIC ARTICLE
Filed Dec. 30, 1963  2 Sheets-Sheet 2

3,278,152
MOLD FOR PLASTIC ARTICLE
Christian F. Miller, Chicago, Ill., and John C. Bletzinger, Neenah, Wis.; said Bletzinger assignor to Kimberly-Clark Corporation, Neenah, Wis., a corporation of Delaware, and said Miller assignor to Formold Plastics, Inc., Blue Island, Ill., a corporation of Illinois
Filed Dec. 30, 1963, Ser. No. 334,093
14 Claims. (Cl. 249—141)

This invention relates generally to the art of plastics molding and relates more particularly to improvements in molding dies.

In one specific aspect, the present invention relates to a molding die for use in making a one-piece buckle-type fastener having a number of fine, fabric-retaining teeth.

As a general rule, molded plastic parts are more easily and more economically produced on a commercial scale if they are designed to avoid thin sections and sharp radii. Moreover, the pronounced difficulties that are ordinarily encountered in molding parts with delicate protuberances have, in the past, rather completely frustrated their manufacture. As a consequence, many highly useful plastic articles are not available to the public because the functioning of such articles is dependant upon the presence of precisely shaped protuberances of refined section.

Accordingly, an important object of the present invention is to provide molding apparatus that is capable of successfully producing a finished part having numerous fine protuberances.

A more general object of the invention is to provide new and improved molding apparatus.

Another object of the invention is to provide molding apparatus that is capable of producing an intricate plastic part in a simple, easy and economical manner.

Still another object of the invention is to provide a plastics molding die that is arranged to prevent overheating whereby to avoid burning thin sections of the finished part.

Yet another object of the invention is to provide a strong mold capable of withstanding heavy usage without failure or such wear as would change the definition or dimensions of the finished parts.

And yet another object of the invention is to provide molding apparatus for making parts having numerous fine protuberances which are aligned closely adjacent an extreme verge.

These and other objects and features of the invention will become more apparent from a consideration of the following disclosure.

A molding die in accord with the invention includes a cover platen and a base platen which are cooperatively recessed to define a mold cavity therebetween. One of the two platens is fashioned with a transverse passageway which opens into the mold cavity through a plurality of relatively deep, parallel slots; and an insert member is disposed in the passageway. This insert member is fashioned with a plurality of blades on its inner end, these blades being shaped to cooperate with the walls of the slots in defining cavity regions for protuberances to be formed on the finished part.

In order that the principles of the invention may be readily understood, a single embodiment thereof applied to the manufacture of a buckle-type fastener, but to which the application is not to be restricted, is shown in the accompanying drawings wherein:

FIG. 1 is a plan view of a one-piece, plastic, buckle-type fastener of the kind whose production is contemplated by the present invention, this fastener having a number of integral, fine, fabric-retaining teeth disposed in two parallel rows;

FIG. 2 is an end elevational view of the fastener of FIG. 1, being taken substantially along the line 2—2 of FIG. 1;

FIG. 3 is an enlarged sectional view taken substantially along the line 3—3 of FIG. 1;

FIG. 4 is a further enlarged sectional view showing the center bar and the fabric-retaining teeth of the fastener of FIG. 1;

FIG. 5 is an enlarged view of die apparatus for molding the plastic fastener of FIGS. 1–4;

Figure 8:
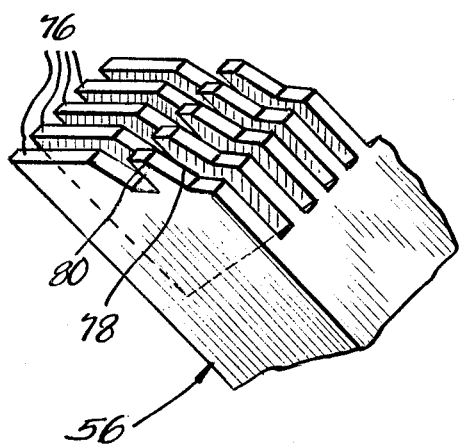
Figure 9:
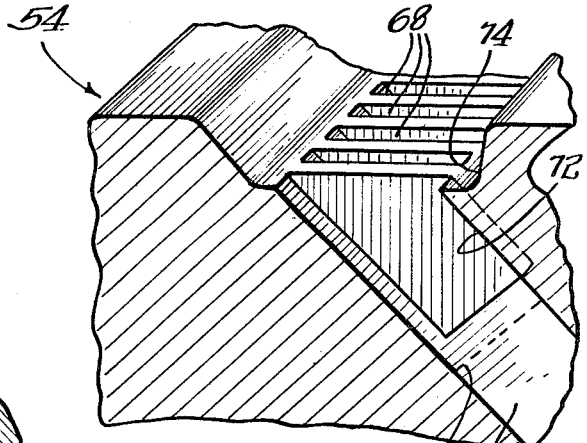

FIG. 8 is an enlarged, fragmentary perspective view of the bladed end of the insert member used in the die apparatus of FIG. 5; and FIG. 9 is an enlarged, fragmentary perspective view of the base platen of the die apparatus of FIG. 5, being taken in section to show the passageway for receiving the insert member and to show the slots which cooperate with the bladed end of the insert member in defining cavity regions which are used in producing the tooth-like protuberances on the fastener of FIGS. 1–4.

Referring now in detail to the drawings, and giving first consideration to FIGS. 1–4, a one-piece fastener of the buckle-type is indicated there generally by the numeral 20. The fastener 20 is of flat, substantially rectangular configuration and includes a pair of side bars 22. The side bars 22 are disposed in parallel relationship and are spaced apart to be interconnected at their lower ends by a continuous central bar 26 which is situated parallel to the transverse bar 24 to cooperate in defining a rectangular aperture 28. At their opposite ends, the side bars 22 merge into a split top bar 30, the bar 30 comprising individual bar sections 32 and 34. The bar sections 32 and 34 are disposed generally parallel to the central bar 26 spaced apart therefrom to form an aperture 36, sections 32 and 34 being endwise spaced apart to define an access slot 38 that opens into the aperture 36. If desired, the transverse bar 24 may be provided with a central discontinuity in order to facilitate use of the fastener 20. However, both of the bars 24 and 30 may be arranged to be continuous although a fastener so arranged has been found to be of somewhat diminished convenience.

The central bar 26 of the fastener 20 is advantageously provided with a plurality of generally pointed protuberances or teeth 40 which are shown to be disposed in two parallel rows. It is to be understood that a single row of the protuberances 40 or more than two rows may also be employed. The tooth-like protuberances 40 are laterally spaced apart in each of the rows and are disposed in generally parallel relationship. As is shown in FIG. 3, the fastener 20 is possessed of a principal plane 42; and the protuberances 40 are inclined with respect to this plane. Each of the protuberances 40 is fashioned with a front face 44 that is disposed at an acute angle with respect to the plane 42, a particularly advantageous angle being forty-five degrees in compliance with the showing of FIG. 3. The opposite or back face of each protuberance 40 may be disposed at the same angle or at a more acute angle such as thirty degrees.

In use, the fastener 20 is attached to a main garment and is employed in securing a strap-like fabric member to such garment. Specifically, the fastener 20 is used by threading the fabric member beneath the transverse bar 24, upwardly through the aperture 28, over the central bar 26, downwardly through the aperture 36 and under the bar 30, the fabric member being conveniently positioned in the aperture 36 and beneath the bar 30 by being twisted to negotiate the access slot 38. In such position, the fabric member is penetrated by the protuberances 40 whereby to be secured in place against dislodgement. However, it is to be recognized that the fabric member may be adjusted relative to the fastener 20 by being pulled relative thereto generally in a direction from the bar 24 toward the bar 30. Release of the fabric member from the fastener 20 is achieved by separating it from the protuberances 40.

Successful functioning of the fastener 20 has been found to depend upon the protuberances 40 being of sufficient length to penetrate and become attached to the fabric member; and while these protuberances must not be long and sharp such as needles are, they should have a somewhat pointed terminus so that the fabric is easily penetrated and caught. In one specific embodiment, the fastener 20 is made to be about 0.078 inch thick with the transverse dimension parallel to the bar 26 being about 1.125 inches and with the cross dimension being about 0.86 inch. Correspondingly, each of the protuberances 40 has been fashioned to take the shape of a truncated oblique triangular prism, the truncated top of which is spaced about 0.021 inch from the corresponding surface of the central bar 26. In addition, the width of each protuberance in this specific embodiment is about 0.020 inch, and the protuberances are spaced from each other by distance of about 0.040 inch.

With particular reference to FIG. 4, proper functioning of the fastener 20 has been found to depend upon locating a leading row of protuberances 40a relatively close to the corresponding edge of the central bar 26. More specifically, each protuberance 40a includes a root or base 46 which is located closely adjacent an extreme verge or sharply deflected surface 48 of the central bar 26. Thus, the tip of the protuberance 40a is situated substantially in contact with an imaginary plane defined by the verge or sharply deflected surface 48. So positioned, the row of protuberances 40a acts to catch and retain the fabric member with great efficiency. A trailing row of protuberances 40b is aligned with the leading row spaced further back from the verge 48. It is to be understood, of course, that variations in the height and angularity of the protuberances may be made in each row as is desired.

The fastener 20 is preferably made from a tough, somewhat flexible, resinous plastic material, such as for example the polyolefins and the acetal resins. When the fastener 20 is to be fabricated from such a material, the injection molding process is conveniently employed.

Die apparatus for molding the fastener 20 is illustrated in FIGS. 5–9, this die apparatus being indicated generally by the reference numeral 50 in FIG. 5. The die apparatus 50 includes a cover piece or platen 52, a base piece or platen 54 and an insert member 56 which is disposed in a transverse passageway 58 formed in one of the platens 52 and 54, specifically in the base platen 54 in the illustrated embodiment. In order to define the main mold cavity that is to be used in forming a fastener 20, the cover platen 52 and the base platen 54 are provided with cooperating recesses 60 and 62 respectively; and the cover platen 52 is fashioned with a gate 64 which opens into the mold cavity from the exterior. When the cover platen 52 and the base platen 54 are situated in contact with each other and with the recesses 60 and 62 located in alignment, the confronting faces of the cover platen and base platen define a parting plane 66 that corresponds with the principal plane 42 of the fastener as described hereinabove with reference to FIG. 3. Advantageously, the recesses 60 and 62 are formed in the respective platens by the conventional die-making procedure known as "hobbing" wherein a hardened metal hob corresponding generally to the shape of the part to be produced is pressed into the unhardened metal of a molding die to make the cavity therein.

Figure 6:
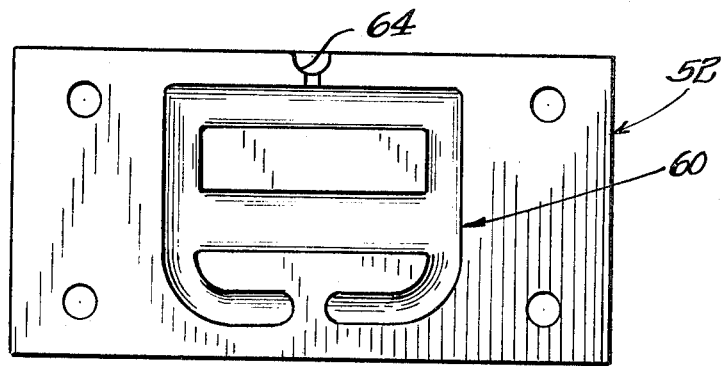
FIG. 6 is a reduced scale plan view of the cover platen of the die apparatus of FIG. 5.
Figure 7:
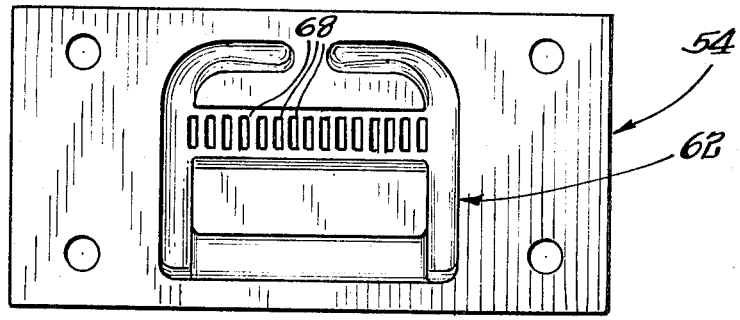
FIG. 7 is a reduced scale plan view of the base platen of the die apparatus of FIG. 5.

It has been found to be impossible to form the cavity regions for the protuberances 40 using the hobbing procedure. Similarly, it has been found to be extremely difficult to hob the metal of base platen 54 to generate a sharp corner whereby to develop the acute angle at the root of each protuberance. Therefore and in compliance with an important feature of the invention, the passageway 58 is arranged to open into the mold cavity at the region corresponding to the central bar 26 of the fastener 20 and to open into the mold cavity through a plurality of parallel slots 68 which are shown in FIGS. 7 and 9. Conveniently, the passageway 58 is formed by milling from into the exterior surface of base platen 54 to the depth of approximately the line indicated by numeral 70 in FIG. 9. The remainder of the passageway 58 and the slots 68 are then formed by electrical discharge machining in which the metal to be removed is actually disintegrated. The slots 68 are relatively deep and have a longitudinal extent sufficient to cover the entire root area of the aligned protuberances 40a and 40b. Furthermore, each of the slots 68 is fashioned with an end wall 72 which is inclined with respect to the plane of the mold cavity at the same angle that the protuberances 40 are inclined with respect to the part plane 42. The main cavity is fashioned with a front wall or face 74 which defines the verge 48 of the fastener 20, and the end walls 72 of the slot 68 are disposed closely adjacent the face 74 in order that they may cooperate in defining faces of the cavity region for the protuberances 40a.

With reference to FIG. 8, the insert member 56 is fashioned with a number of blades 76 on its inner end; and the blades 76 are shaped and laterally spaced apart to cooperate with the walls of the slots 68 in defining the cavity regions for the protuberances 40. Specifically, each of the blades 76 is fashioned with a frusto-pyramidal notch 78 which cooperates with the end wall 72 in forming a cavity region for a leading protuberance 40a. Each of the blades 76 is also fashioned with a frusto-pyramidal notch 80 which is spaced from the notch 78 to define the cavity region for a trailing protuberance 40b. The blades 76 are conveniently formed by milling out the metal in the spaces between the blades; and the notches 78 and 80 are also conveniently formed by a milling procedure. Alternatively, the insert member 56 may comprise a unitary assembly of individual blades and spacer elements. It is to be understood that the shape of the notches 78 and 80 may be altered from that shown when a different shape is required for the protuberances 40. The end walls 72 of the slots 68 have been described as being inclined with respect to the plane of the main cavity in the die apparatus 50; and it is to be understood that this angle of inclination corresponds to the angle at which the front face 44 of the protuberances 40 is inclined with respect to the part plane 42. Accordingly, the angle of inclination of the end walls 72 is advantageously an acute angle, specifically an angle of forty-five degrees. By employing the inclined end walls 72 in conjunction with the notches 78 to define the cavities for the protuberances 40a, a strong mold is produced which is capable of resisting heavy usage and which accurately molds the material of the fastener 20 to form the protuberances in a precise manner.

In compliance with another feature of the invention, the back walls of the cavity 62 are inclined with respect to the cavity plane either at the same angle as the end walls 72 or at a more acute angle than the end walls 72. Furthermore, the front walls of the cavity 62 are obtusely angled with respect to the cavity plane. With the cavity walls so arranged, the finished part may be readily extracted from the mold cavity in a path substantially parallel with the end walls 72. The finished fastener may thus be removed from the mold simply and easily and without danger of damage to the protuberances 40. More specifically and considering FIG. 5, the cavity recess 62 will be seen to be provided with back walls 82 and 84 which are disposed parallel with the end walls 72, recess 62 being additionally provided with a back wall 86 that is inclined at a more acute angle than the back walls 82 and 84. In addition, the recess 62 is provided with front walls 88 and 90 which are inclined with respect to the cavity plane at an angle of approximately one hundred degrees. Front wall 74 is disposed generally parallel with the front walls 88 and 90.

In compliance with another feature of the invention, the insert member 56 is arranged to be of smaller dimension than the passageway 58 in order to fit therein with sufficient looseness to permit gases to escape from the mold cavity about the insert member. Provision of such an escape path in the immediate vicinity of the cavity regions for the protuberances 40 is important to the successful molding of the protuberances. If such provision were not made, the air in the mold cavity would be compressed by the molten plastic entering the cavity through the gate 64. This compression of the air within the mold cavity would cause the air to rise in temperature; and the resultant heat would be transferred to the walls of the cavity, overheating them and subjecting fine parts such as the protuberances 40 to burning or complete carbonization. It will be understood, of course, that provision of conventional capillary tubes for the egress of this air would be extremely difficult in view of the fine dimensions of the protuberances.

Operation of the die apparatus 50 will be apparent from the foregoing descriptions.

While a particular embodiment of the invention has been herein shown and described, it should be understood, of course, that the invention is not limited thereto since many modifications may be made; and it is therefore, contemplated to cover by the present application any such modifications as fall within the true spirit and scope of the appended claims.

We claim:

1. Apparatus for molding a plastic part having a plurality of fine protuberances, said apparatus comprising: a cover platen; a base platen, said cover platen and said base platen being cooperatively recessed to define a mold cavity, one of said platens having a transverse passageway which opens into said mold cavity through a plurality of slots; and an insert member disposed in said passageway and having on its inner end a plurality of blades which are shaped to cooperate with the walls of said slots in defining the cavity regions for said protuberances.

2. Apparatus for molding a plastic part having a plurality of fine protuberances, said apparatus comprising: a cover platen; a base platen, said cover platen and said base platen being cooperatively recessed to define a mold cavity, one of said platens having a transverse passageway which opens into said mold cavity through a plurality of slots; and an insert member disposed in said passageway and having on its inner end a plurality of blades which are shaped to cooperate with the walls of said slots in defining the cavity regions for said protuberances, said insert member being of smaller dimension than said passageway to fit therein with sufficient looseness to permit gases to escape from said mold cavity about said insert member.

3. Apparatus for molding a plastic part having a plurality of fine protuberances that are inclined with respect to the principal plane of the part, said apparatus comprising: a cover platen; a base platen, said cover platen and said base platen being cooperatively recessed to define a mold cavity having a plane corresponding to the principal plane of the part, one of said platens having a transverse passageway which opens into said mold cavity through a plurality of slots, similar end walls of said slots being inclined with respect to said cavity plane at the same angle that said protuberances are inclined with respect to said part plane whereby each of said end walls defines one face of a cavity region for a said protuberance; and an insert member disposed in said passageway and having on its inner end a plurality of blades which are shaped to cooperate with the walls of said slot in defining the cavity regions for said protuberances.

4. Apparatus for molding a plastic part having a plurality of fine protuberances that are inclined with respect to the principal plane of the part, said apparatus comprising: a cover platen; a base platen, said cover platen and said base platen being cooperatively recessed to define a mold cavity having a plane corresponding to the principal plane of the part, one of said platens having a transverse passageway which opens into said mold cavity through a plurality of slots, similar end walls of said slots being inclined with respect to said cavity plane at the same angle that said protuberances are inclined with respect to said part plane whereby each of said end walls defines one face of a cavity region for a said protuberance; and an insert member disposed in said passageway and having on its inner end a plurality of blades which are shaped to cooperate with the walls of said slot in defining the cavity regions for said protuberances, the back walls of the recess in said one platen being substantially parallel with said similar end walls and the front walls of said recess being obtusely angled with respect to said cavity plane whereby to permit extraction of the finished part from the mold cavity in a path substantially parallel with said similar end walls for protecting said protuberances.

5. Apparatus according to claim 3 wherein said angle is an acute angle.

6. Apparatus according to claim 5 wherein said acute angle is an angle of forty-five degrees.

7. Apparatus for molding a plastic part having at least one row of fine, parallel disposed protuberances that are inclined with respect to the principal plane of the part and that are situated closely adjacent an extreme verge thereof, said apparatus comprising: a cover platen; a base platen, said cover platen and said base platen being cooperatively recessed to define a mold cavity having a plane corresponding to principal plane of the part, one of said platens having a transverse passageway which opens into said mold cavity through a plurality of relatively deep, parallel slots, similar end walls of said slot being disposed closely adjacent the main cavity face defining the verge and being inclined with respect to said cavity plane at the same angle that said protuberances are inclined with respect to said part plane whereby each of said end walls defines that face of a cavity region for a said protuberance which is closely adjacent the main cavity face defining said verge; and an insert member disposed in said passageway and having on its inner end a plurality of blades which are shaped to cooperate with the walls of said slot in defining the cavity regions for said protuberances.

8. Apparatus for molding a plastic part having a plurality of fine protuberances, said apparatus comprising: a cover platen; a base platen, said cover platen and said base platen being cooperatively recessed to define a mold cavity, one of said platens having a transverse passageway which opens into said mold cavity through a plurality of slots; and an insert member disposed in said passageway and having on its inner end a plurality of blades which are shaped to cooperate with the walls of said slots in defining the cavity regions for said protuberances, each of said blades being fashioned with a pyramidal notch for use in defining a said cavity region.

9. Apparatus according to claim 8 wherein said notches are frusto-pyramidal notches.

10. Apparatus for molding a plastic part having two rows of fine, parallel disposed protuberances that are inclined with respect to the principal of the part, said apparatus comprising: a cover platen; a base platen, said cover platen and said base platen being cooperatively recessed to define a mold cavity having a plane corresponding to the principal plane of the part, one of said platens having a transverse passageway which opens into said mold cavity through a plurality of parallel slots, similar end walls of said slots being inclined with respect to said cavity at the same angle that said protuberances are inclined with respect to said part plane whereby each of said end walls defines one face of a cavity region for a said protuberance in one of said rows; and an insert member disposed in said passageway and having on its inner end a plurality of blades which are shaped to cooperate with the walls of said slots in defining the cavity regions for said two rows of protuberances.

11. Apparatus for molding a plastic part having two rows of fine, parallel disposed protuberances that are inclined with respect to the principal plane of the part, said apparatus comprising: a cover platen; a base platen, said cover platen and said base platen being cooperatively recessed to define a mold cavity having a plane corresponding to the principal plane of the part, one of said platens having a transverse passageway which opens into said mold cavity through a plurality of parallel slots, similar end walls of said slots being inclined with respect to said cavity plane at the same angle that said protuberances are inclined with respect to said part plane whereby each of said end walls defines one face of a cavity region for a said protuberance in one of said rows; and an insert member disposed in said passageway and having on its inner end a plurality of blades which are shaped to cooperate with the walls of said slots in defining the cavity regions for said protuberances, each of said blades being fashioned with two spaced, pyramidal notches for use in defining the cavity regions for a protuberance in each of said rows.

12. Apparatus for molding a plastic part having two rows of fine, parallel disposed protuberances that are inclined with respect to the principal of the part, said apparatus comprising: a cover platen; a base platen, said cover platen and said base platen being cooperatively recessed to define a mold cavity having a plane corresponding to the principal plane of the part, one of said platens having a transverse passageway which opens into said mold cavity through a plurality of parallel slots of said slots being inclined with respect to said cavity at the same angle that said protuberances are inclined with respect to said part plane whereby each of said end walls defines one face of a cavity region for a said protuberance in one of said rows; and an insert member disposed in said passageway and having on its inner end a plurality of blades which are shaped to cooperate with the walls of said slots in defining the cavity regions for said two rows of protuberances, said insert member being of smaller dimension than said passageway to fit therein with sufficient looseness to permit gases to escape from said mold cavity about said insert member.

13. Apparatus for molding a plastic part having two rows of fine, parallel disposed protuberances that are inclined with respect to the principal plane of the part, said apparatus comprising: a cover platen; a base platen, said cover platen and said base platen being cooperatively recessed to define a mold cavity having a plane corresponding to the principal plane of the part, one of said platens having a transverse passageway which opens into said mold cavity through a plurality of relatively deep, parallel slots, similar end walls of said slots being inclined with respect to said cavity plane at the same angle that said protuberances are inclined with respect to said parts plane whereby each of said end walls defines one face of a cavity region for a said protuberance in one of said rows, the back walls of the recess in said one platen being disposed substantially parallel with said similar end walls and the front walls of said recess being obtusely angled with respect to said cavity plane whereby to permit extraction of the finished part from the mold cavity in a path substantially parallel with said similar end walls for protecting said protuberances; and an insert member disposed in said passageway and having on its inner end a plurality of blades which are shaped to cooperate with the walls of said slots in defining the cavity regions for said protuberances.

14. Apparatus according to claim 10 wherein said angle is an acute angle.

References Cited by the Examiner
UNITED STATES PATENTS

| | | | |
|---|---|---|---|
| 1,985,341 | 12/1934 | Fraser | 18—44 X |
| 2,578,719 | 12/1951 | Mayer et al. | 18—42 |
| 3,016,579 | 1/1962 | Schlitzkus. | |

J. SPENCER OVERHOLSER, *Primary Examiner.*

E. MAR, *Assistant Examiner.*